United States Patent
Ma et al.

(10) Patent No.: US 11,523,446 B2
(45) Date of Patent: Dec. 6, 2022

(54) METHOD AND DEVICE FOR REPORTING IDENTITY

(71) Applicant: VIVO MOBILE COMMUNICATION CO., LTD., Guangdong (CN)

(72) Inventors: Yue Ma, Chang'an Dongguan (CN); Xiaodong Yang, Chang'an Dongguan (CN); Xiaowan Ke, Chang'an Dongguan (CN)

(73) Assignee: VIVO MOBILE COMMUNICATION CO., LTD., Chang'an Dongguan (CN)

( * ) Notice: Subject to any disclaimer, the term of this patent is extended or adjusted under 35 U.S.C. 154(b) by 87 days.

(21) Appl. No.: 17/039,496

(22) Filed: Sep. 30, 2020

(65) Prior Publication Data

US 2021/0022193 A1    Jan. 21, 2021

Related U.S. Application Data

(63) Continuation of application No. PCT/CN2019/080991, filed on Apr. 2, 2019.

(30) Foreign Application Priority Data

Apr. 3, 2018 (CN) .......................... 201810295830.X (51) Int. Cl.
```
H04W 4/00      (2018.01)
H04W 76/11     (2018.01)
H04W 8/18      (2009.01)
H04W 68/00     (2009.01)
H04W 72/14     (2009.01)
```
(52) U.S. Cl.
CPC ............ *H04W 76/11* (2018.02); *H04W 8/183* (2013.01); *H04W 68/005* (2013.01); *H04W 72/14* (2013.01)

(58) Field of Classification Search
CPC ... H04W 76/11; H04W 8/183; H04W 68/005; H04W 72/14; H04W 74/0833; H04W 8/26; H04W 4/18; H04W 8/205; H04W 72/042
USPC .................................................. 370/329, 330
See application file for complete search history.

(56) References Cited

U.S. PATENT DOCUMENTS

| 2009/0163211 A1 | 6/2009 | Kitazoe et al. |
| 2009/0186612 A1* | 7/2009 | Aghili ................. H04W 8/02 455/432.1 |

(Continued)

FOREIGN PATENT DOCUMENTS

| CN | 101904213 A | 12/2010 |

OTHER PUBLICATIONS

International Search Report and Written Opinion issued in corresponding application No. PCT/CN2019/080991, dated Oct. 15, 2020.

(Continued)

*Primary Examiner* — Chuong T Ho
(74) *Attorney, Agent, or Firm* — Maschoff Brennan (57) ABSTRACT

A method and a device for reporting an identity are provided according to embodiments of the present disclosure. The method includes: when determining that the number of bits of a temporary mobile subscriber identity (S-TMSI) is greater than M, selecting M bits from the bits of the S-TMSI, M being a predetermined positive integer; and transmitting a first message 3 (MSG 3) to a network device, where the first MSG 3 carries the M bits.

17 Claims, 3 Drawing Sheets

(56) References Cited

U.S. PATENT DOCUMENTS

| | | | | |
|---|---|---|---|---|
| 2015/0063223 | A1* | 3/2015 | Shen | H04W 52/265 |
| | | | | 370/329 |
| 2017/0238345 | A1* | 8/2017 | Liu | H04W 74/08 |
| | | | | 370/329 |
| 2017/0295489 | A1 | 10/2017 | Agiwal et al. | |
| 2017/0374644 | A1 | 12/2017 | Ryu et al. | |
| 2018/0084405 | A1* | 3/2018 | Xi | H04W 12/08 |
| 2018/0084455 | A1* | 3/2018 | Liu | H04W 74/0833 |
| 2018/0270790 | A1* | 9/2018 | Shi | H04W 68/02 |
| 2019/0124715 | A1* | 4/2019 | Chen | H04W 76/27 |
| 2019/0327770 | A1* | 10/2019 | Liu | H04W 74/08 |
| 2019/0350005 | A1* | 11/2019 | Liu | H04W 72/06 |
| 2020/0037360 | A1* | 1/2020 | Qian | H04W 16/28 |
| 2020/0359260 | A1* | 11/2020 | Gao | H04W 28/06 |

OTHER PUBLICATIONS

"Email Discussion Report on Message 3 Size for NB-IoT", 3GPP TSG-RAN WG2 #93, Malta, Feb. 15-19, 2016.

European Search Report dated Apr. 30, 2021 as received in application No. 19781877.6.

"3rd Generation Partnership Project; Technical Specification Group Core Network and Terminals; Numbering, addressing and identification (Release 15)" 3GPP TS 23.003, Mar. 2018.

"The first x bits of CCCH SDU transmitted in Msg3" 3GPP TSG RAN WG2 #100, R2-1712203, Reno, USA, Nov. 27-Dec. 1, 2017. OPPO.

"Message 3.5 in LTC connected to 5GC" 3GPP TSG-RAN WG2 #100, Tdoc R2-1713273, Reno, USA, Nov. 27-Dec. 1, 2017, Ericsson.

"Impact from 48 bit 5G-S-TMSI (LTC and NR)" 3GPP TSG-RAN WG2 #1010-Bis, Tdoc R2-1804858, Sanya, P.R. of China, Apr. 16-20, 2018, Ericsson.

"Offline discussion report on [101#10][LTE/5GC] 5G-S-TMSI size in LTC connected to 5GC" 3GPP TSG-RAN WG2 #101Bis, Tdoc R2-1806475, Sanya, China Apr. 16-20, 2018. Ericsson.

"Mapping between 4G GUTI and 5G GUTI" 3GPP TSG-SA WG2 Meeting #126, S2-182000, Montreal, Canada, Feb. 26-Mar. 2, 2018. Huawei.

\* cited by examiner

Fig. 1

Fig. 2 receiving a first message 3 (MSG 3) transmitted by a terminal device, wherein the first MSG 3 carries M bits, the M bits are selected from bits of a temporary mobile subscriber identity (S-TMSI) when the terminal device determines that the number of bits of the S-TMSI is greater than M, and M is a predetermined positive integer — S310

METHOD AND DEVICE FOR REPORTING IDENTITY

CROSS-REFERENCE TO RELATED APPLICATIONS

This application is a continuation application of PCT International Application No. PCT/CN2019/080991 filed on Apr. 2, 2019, which claims a priority to Chinese Patent Application No. 201810295830.X filed on Apr. 3, 2018, the disclosures of which are incorporated in their entireties by reference herein.

TECHNICAL FIELD

The present disclosure relates to the technical field of communications, in particular to a method and a device for reporting an identity.

BACKGROUND

In long term evolution (Long Term Evolution, LTE) systems, temporary mobile subscriber identity (S-TMSI) is an identity of a terminal device registered on mobility management entity (Mobility Management Entity, MME) for a core network, which exists to correspond to evolved packet core (Evolved Packet Core, EPC), and the total length of S-TMSI is 40 bits (bits). At present, S-TMSI is mainly used in the uplink message 3 (MSG 3) for initial access and in a downlink paging (Paging) message for a terminal device. In MSG 3, S-TMSI is mainly used to identify a terminal device, so that the network may perform contention resolution for different UEs, and at the same time, the wireless network may obtain relevant registration information of the terminal device from the core network. The downlink paging message is mainly used for the core network to page a terminal device.

The conventional MSG 3 in the existing protocol has a minimum length of 56 bits (with a 2-byte (byte) medium access control (Medium Access Control, MAC) header), and 55 bits are occupied. The system architecture evolution temporary mobile subscriber identity (System Architecture Evolution-Temporary Mobile Subscriber Identity, S-TMSI) may be carried in the MSG 3 for the terminal device and may be reported to the network device. In this case, if the length of an S-TMSI in future mobile communication systems (for example, new radio (New Radio, NR) system) exceeds 40 bits, the terminal device cannot report the S-TMSI to the network device during a random access procedure.

SUMMARY

Embodiments of the present disclosure are to provide a method and a device for reporting an identity, which can provide a solution for a terminal device to report, to a network device, an S-TMSI whose length exceeds an S-TMSI length specified in an existing protocol, and can improve effectiveness of communications.

In a first aspect, embodiments of the present disclosure provide a method for reporting an identity. The method includes:

when determining that the number of bits of a temporary mobile subscriber identity (S-TMSI) is greater than M, selecting M bits from the bits of the S-TMSI, where M is a predetermined positive integer; and transmitting a first message 3 (MSG 3) to a network device, where the first MSG 3 carries the M bits.

In a second aspect, embodiments of the present disclosure provide a method for reporting an identity. The method includes:

receiving a first message 3 (MSG 3) transmitted by a terminal device, where the first MSG 3 carries M bits, the M bits are selected from bits of a temporary mobile subscriber identity (S-TMSI) when the terminal device determines that the number of bits of the S-TMSI is greater than M, and M is a predetermined positive integer.

In a third aspect, embodiments of the present disclosure provide a terminal device. The terminal device includes:

a processing unit, configured to, when determine that the number of bits of a temporary mobile subscriber identity (S-TMSI) is greater than M, select M bits from the bits of the S-TMSI, where M is a predetermined positive integer; and a transceiver module, configured to transmit a first message 3 (MSG 3) to a network device, where the first MSG 3 carries the M bits.

In a fourth aspect, embodiments of the present disclosure provide a network device, which includes:

a transceiver module, configured to receive a first message 3 (MSG 3) transmitted by a terminal device, where the first MSG 3 carries M bits, the M bits are selected from bits of a temporary mobile subscriber identity (S-TMSI) when the terminal device determines that the number of bits of the S-TMSI is greater than M, and M is a predetermined positive integer.

In a fifth aspect, embodiments of the present disclosure provide a terminal device. The terminal device includes a processor, a memory, and a program that is stored on the memory and executable on the processor. When executing the program, the processor is configured to implement steps of the method described in the first aspect.

In a sixth aspect, embodiments of the present disclosure provide a terminal device. The terminal device includes a processor, a memory, and a program that is stored on the memory and executable on the processor. When executing the program, the processor is configured to implement steps of the method described in the second aspect.

In a seventh aspect, embodiments of the present disclosure provide a computer-readable storage medium. A program is stored on the computer-readable storage medium, and the program is executed by a processor to implement steps of the method described in the first aspect.

In an eighth aspect, embodiments of the present disclosure provide a computer-readable storage medium. A program is stored on the computer-readable storage medium, and the program is executed by a processor to implement steps of the method described in the second aspect.

In the embodiments of the present disclosure, when determining that the number of bits of a temporary mobile subscriber identity (S-TMSI) to be reported is greater than a predetermined positive integer M, a terminal device selects M bits from the bits of the S-TMSI, and the selected M bits are carried by MSG 3, so that S-TMSI reporting is successfully achieved. Therefore, a solution is provided for the terminal device to report, to a network device, the S-TMSI whose length exceeds an S-TMSI length specified in an existing protocol, so that a core network identity of any length can be supported in the new radio, thereby improving the effectiveness of communications.

BRIEF DESCRIPTION OF THE DRAWINGS

The drawings described herein are used to facilitate a further understanding of the present disclosure and constitute a part of the present disclosure. Exemplary embodiments of the present disclosure and descriptions thereof are used to explain the present disclosure, and do not constitute any improper limitation to the present disclosure.

DETAILED DESCRIPTION

A technical solution in embodiments of the present disclosure will be described clearly and completely with reference to the accompanying drawings in the embodiments of the present disclosure. Obviously, the described embodiments are part of the embodiments of the present disclosure, rather than all of the embodiments. Based on the embodiments in the present disclosure, all other embodiments obtained by those of ordinary skill in the art without creative effort shall fall within the protection scope of the present disclosure.

The technical solution of the present disclosure can be applied to various communication systems, for example, global system of mobile communication (Global System of Mobile communication, GSM), code division multiple access (Code Division Multiple Access, CDMA) system, wideband code division multiple access (Wideband Code Division Multiple Access, WCDMA) system, general packet radio service (General Packet Radio Service, GPRS) system, long term evolution (Long Term Evolution, LTE)/long term evolution-advanced (Long Term Evolution-advanced, LTE-A) system, and new radio (NR) system, etc.

Terminal device (User Equipment, UE), also referred to as mobile terminal (Mobile Terminal), mobile user equipment, etc., can communicate with one or more core networks via a radio access network (for example, radio access network (Radio Access Network, RAN). User equipment may be a mobile terminal, such as a mobile phone (or "cellular" phone) and a computer with a mobile terminal, which, for example, may be a portable mobile device, a pocket-sized mobile device, a handheld mobile device, a mobile device built in a computer or a vehicle-mounted mobile device. The UE exchanges language and/or data with a wireless access network.

Network device is a device deployed in a wireless access network to provide wireless communications functions for a terminal device. The network device may be a base station, and the base station may be a base station (Base Transceiver Station, BTS) in GSM or CDMA, a base station (NodeB) in WCDMA, an evolved base station (evolutional Node B, eNB or e-NodeB) in LTE, or a 5G ($5^{th}$ Generation) base station (gNB), which is not limited in the present disclosure.

The technical solutions provided by various embodiments of the present disclosure will be described in detail below with reference to the accompanying drawings.

Figure 1:
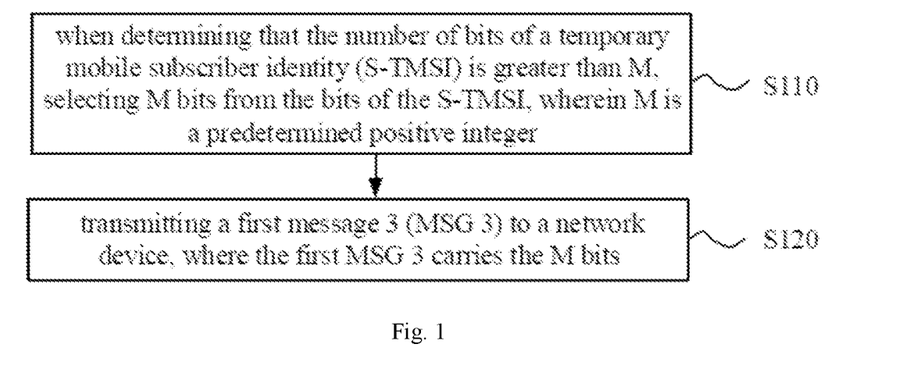
FIG. 1 is a schematic flowchart of a method for reporting an identity according to an embodiment of the present disclosure.

FIG. 1 shows a method for reporting an identity according to an embodiment of the present disclosure. As shown in FIG. 1, the method includes steps S110 and S120.

Step S110 includes: when determining that the number of bits of a temporary mobile subscriber identity (S-TMSI) is greater than M, selecting M bits from the bits of the S-TMSI, wherein M is a predetermined positive integer.

Optionally, as an example, the bits of the S-TMSI include a first group of bits, a second group of bits, and a third group of bits, the number of the first group of bits is N, the number of the second group of bits is K, the number of the third group of bits is L, N, K, and L are positive integers, and the sum of N, K, and L is greater than M.

For instance, S-TMSI (5G-S-TMSI) in a 5G system is given as an example, and 5G-S-TMSI is an identity of a terminal device registered on an access and mobility management function (Access and Mobility Management Function, AMF) entity for a core network, which exists to correspond to AMF. The 5G-S-TMSI includes: <5G-S-TMSI>=<AMF Set ID><AMF Pointer><5G-TMSI>, where <AMF Set ID> and <AMF Pointer> are identities indicating AMF, and the lengths thereof are currently undetermined. 5G-TMSI has a length of 32 bits, and indicates an identity of the terminal device corresponding to the AMF. That is, the first group of bits is used to carry an AMF set identity (AMF Set ID), the second group of bits is used to carry an AMF pointer identity (AMF Pointer), and the third group of bits is used to carry the identity of the terminal device corresponding to the AMF (5G-TMSI). The current S-TMSI in LTE has a length of 40 bits, and if the total length of <AMF Set ID> and <AMF Pointer> is larger than 8 bits, the total length of 5G-S-TMSI may exceed 40 bits. In this case, the terminal device cannot directly carry the 5G-S-TMSI with a length of greater than 40 bits through the MSG 3 in a random access procedure, and thus the terminal device needs to select 40 bits from the 5G-S-TMSI to report.

Optionally, in some embodiments, the selecting the M bits from the bits of the S-TMSI includes selecting the M bits from the bits of the S-TMSI according to one of following manners: reserving all the bits in the first group of bits and all the bits in the second group of bits, and selecting M-N-K bits from the third group of bits, wherein M-N-K is a positive integer; reserving all the bits in the third group of bits, and selecting M-L bits from the first group of bits and the second group of bits, wherein the number of a bit selected from each group of the first group of bits and the second group of bits is not equal to 0; or selecting S bits from the first group of bits and the second group of bits, and selecting M-S bits from the third group of bits, wherein the number of a bit selected from each group of the first group of bits and the second group of bits is not equal to 0, S is less than the sum of L and N, M-S is a positive integer, and M-S is less than L.

Taking 5G-S-TMSI and M being equal to 40 as an example, the selecting 40 bits from 5G-S-TMSI may include: reserving all the bits corresponding to the AMF, and selecting the remaining bits less than 40 bits from the bits corresponding to the 5G-TMSI; or reserving all bits corresponding to the 5G-TMSI, and selecting the remaining bits less than 40 bits from the bits corresponding to the AMF; or selecting some bits respectively from the bits corresponding to the AMF and the bits corresponding to the 5G-TMSI to form the 40 bits.

Specifically, in some embodiments, the selecting the M-N-K bits from the third group of bits includes: selecting M-N-K most significant bits (Most Significant Bits) in the third group of bits; or selecting M-N-K least significant bits (Least significant bits) in the third group of bits. It is understandable that the M-N-K bits may be selected from the third group of bits according to other rules, for example, selecting the middle M-N-K bits in the third group of bits, which is not limited in the embodiments of the present disclosure.

Specifically, in some other embodiments, the selecting the M-L bits from the first group of bits and the second group of bits includes selecting the M-L bits from the first group of bits and the second group of bits according to one of following manners: selecting Z most significant bits in the first group of bits, and selecting M-L-Z most significant bits in the second group of bits; selecting Z most significant bits in the first group of bits, and selecting M-L-Z least significant bits in the second group of bits; selecting Z least significant bits in the first group of bits, and selecting M-L-Z most significant bits in the second group of bits; or selecting Z least significant bits in the first group of bits, and selecting M-L-Z least significant bits in the second group of bits. It is understandable that the M-L bits may be selected from the first group of bits and the second group of bits according to other rules, for example, selecting a total of M-L bits starting from middle bits of the first group of bits and middle bits of the second group of bits, which is not limited in the embodiments of the present disclosure.

By taking 5G-S-TMSI, M being equal to 40 and L being equal 32 as an example, a manner of selecting 8 bits from bits related to <AMF Set ID> and <AMF Pointer> may be: selecting Z most significant bits in the bits related to <AMF Set ID>, and selecting 8-Z most significant bits in the bits related to <AMF Pointer>; or selecting Z most significant bits in the bits related to <AMF Set ID>, and selecting 8-Z least significant bits in the bits related to <AMF Pointer>; or selecting Z least significant bits in the bits related to <AMF Set ID>, and selecting 8-Z most significant bits in the bits related to <AMF Pointer>; or selecting Z least significant bits in the bits related to <AMF Set ID>, and selecting 8-Z least significant bits in the bits related to <AMF Pointer>.

Specifically, in some other embodiments, the selecting the S bits from the first group of bits and the second group of bits, and selecting the M-S bits from the third group of bits includes: selecting the S bits from the first group of bits and the second group of bits, and selecting the M-S bits from the third group of bits according to one of following manners: selecting W most significant bits in the first group of bits, selecting S-W most significant bits in the second group of bits, and selecting M-S most significant bits in the third group of bits; selecting W most significant bits in the first group of bits, selecting S-W most significant bits in the second group of bits, and selecting M-S least significant bits in the third group of bits; selecting W most significant bits in the first group of bits, selecting S-W least significant bits in the second group of bits, and selecting M-S least signifi- cant bits in the third group of bits; selecting W most significant bits in the first group of bits, selecting S-W least significant bits in the second group of bits, and selecting M-S most significant bits in the third group of bits; selecting W least significant bits in the first group of bits, selecting S-W most significant bits in the second group of bits, and selecting M-S most significant bits in the third group of bits; selecting W least significant bits in the first group of bits, selecting S-W most significant bits in the second group of bits, and selecting M-S least significant bits in the third group of bits; selecting W least significant bits in the first group of bits, selecting S-W least significant bits in the second group of bits, and selecting M-S least significant bits in the third group of bits; or selecting W least significant bits in the first group of bits, selecting S-W least significant bits in the second group of bits, and selecting M-S most significant bits in the third group of bits. It is understandable that the selecting the S bits from the first group of bits and the second group of bits, and selecting the M-S bits from the third group of bits may be based on other rules, for example, selecting a total of S bits starting from the middle bits of the first group of bits and the middle bits of the second group of bits, and selecting the M-S bits starting from the middle bits of the third group of bits, which is not limited in the embodiments of the present disclosure.

Taking 5G-S-TMSI and M being equal to 40 as an example, an implementation manner of selecting the S bits from the first group of bits and the second group of bits, and selecting the M-S bits from the third group of bits may include: selecting W most significant bits of the bits related to <AMF Set ID>, selecting S-W most significant bits of the bits related to <AMF Pointer>, and selecting 40-S most significant bits of the bits related to <5G-TMSI>; or selecting W most significant bits of the bits related to <AMF Set ID>, selecting S-W most significant bits of the bits related to <AMF Pointer>, and selecting 40-S least significant bits of the bits related to <5G-TMSI>; or selecting W most significant bits of the bits related to <AMF Set ID>, selecting S-W least significant bits of the bits related to <AMF Pointer>, and selecting 40-S least significant bits of the bits related to the <5G-TMSI>; or selecting W most significant bits of the bits related to <AMF Set ID>, selecting S-W least significant bits of the bits related to <AMF Pointer>, and selecting 40-S most significant bits of the bits related to <5G-TMSI>; or selecting W least significant bits of the bits related to <AMF Set ID>, selecting S-W most significant bits of the bits related to <AMF Pointer>, and selecting the 40-S most significant bits of the bits related to <5G-TMSI>; or selecting W least significant bits of the bits related to <AMF Set ID>, selecting S-W most significant bits of the bits related to <AMF Pointer>, and selecting 40-S least significant bits of the bits related to <5G-TMSI>; or selecting W least significant bits of the bits related to <AMF Set ID>, selecting S-W least significant bits of the bits related to <AMF Pointer>, and selecting 40-S least significant bits of the bits related to <5G-TMSI>; or selecting W least significant bits of the bits related to <AMF Set ID>, selecting S-W least significant bits of the bits related to <AMF Pointer>, and selecting 40-S most significant bits of the bits related to <5G-TMSI>.

It should be noted that the bits of the S-TMSI including the first group of bits, the second group of bits, and the third group of bits is just an example. The number of bit groups included in the bits of the S-TMSI, or the number of TMSI components is not limited in the present disclosure. The method of selecting a preset number of bits from the bits of the S-TMSI described in the foregoing embodiments is also applicable to a case where the number of bit groups included in the bits of the S-TMSI is greater than 3.

Step S120 includes: transmitting a first message 3 (MSG 3) to a network device, where the first MSG 3 carries the M bits.

Optionally, in some embodiments, the terminal device is configured with a first uplink grant resource and a second uplink grant resource. Correspondingly, the transmitting the first MSG 3 to the network device in S120 includes: transmitting the first MSG 3 on the first uplink grant resource.

Further, the method shown in FIG. 1 further includes: transmitting a second MSG 3 on the second uplink grant resource, where the second MSG 3 carries bits of the S-TMSI except the M bits. In this way, the network device can merge the received content in the first MSG 3 and the received content in the second MSG 3 into a completed S-TMSI.

Optionally, in some embodiments, prior to step S120, the method shown in FIG. 1 further includes: determining a target preamble group from a plurality of preamble groups, wherein different preamble groups in the plurality of preamble groups respectively indicate to a network that the terminal device uses different numbers of bits of S-TMSIs or that the terminal device uses MSG 3 with different sizes; selecting a target preamble from the target preamble group; transmitting the target preamble to the network device; and receiving a MSG 2 transmitted by the network device based on the target preamble, wherein the MSG 2 includes indication information for indicating the first uplink grant resource and the second uplink grant resource.

That is to say, the preamble may be grouped, for example, into two groups, where one group corresponds to a terminal device whose S-TMSI has the number of bits equal to 40, and the other group corresponds to a terminal device whose S-TMSI has the number of bits greater than 40 (terminal devices supporting 5G). When a terminal device using the number of bits of S-TMSI greater than 40 transmits MSG 1 to a network device, the terminal device selects a to-be-transmitted preamble from the corresponding preamble group and carries it in MSG 1. The network device can know whether the terminal device supports 5G based on the preamble in MSG 1, and allocates two uplink grant (UL Grant) resources to the terminal device, in a case that the network device determines that the terminal device supports 5G. The terminal device may transmit a first MSG 3 on one of the uplink grant resources (for example, using a format of MSG 3 in LTE), and may transmit a second MSG 3 on the other one of the uplink grant resources, where the second MSG 3 carries the remaining bits of the S-TMSI. Optionally, the network device may obtain the size of MSG 3 used by the terminal device based on the preamble in MSG 1, and then may allocate an uplink grant resource that is large enough to transmit the MSG 3, to the terminal device, and the terminal device transmits only one MAG 3 to the network device on the allocated uplink resource.

Optionally, in some other embodiments, the method shown in FIG. 1 further includes: transmitting a MSG 5 to the network device, wherein the MSG 5 carries bits of the S-TMSI except the M bits; or transmitting a MSG 5 to the network device, wherein the MSG 5 carries all the bits of the S-TMSI. It is understandable that the MSG 5 transmitted by the terminal device to the network device may not include the remaining bits of the S-TMSI bits.

Figure 2:
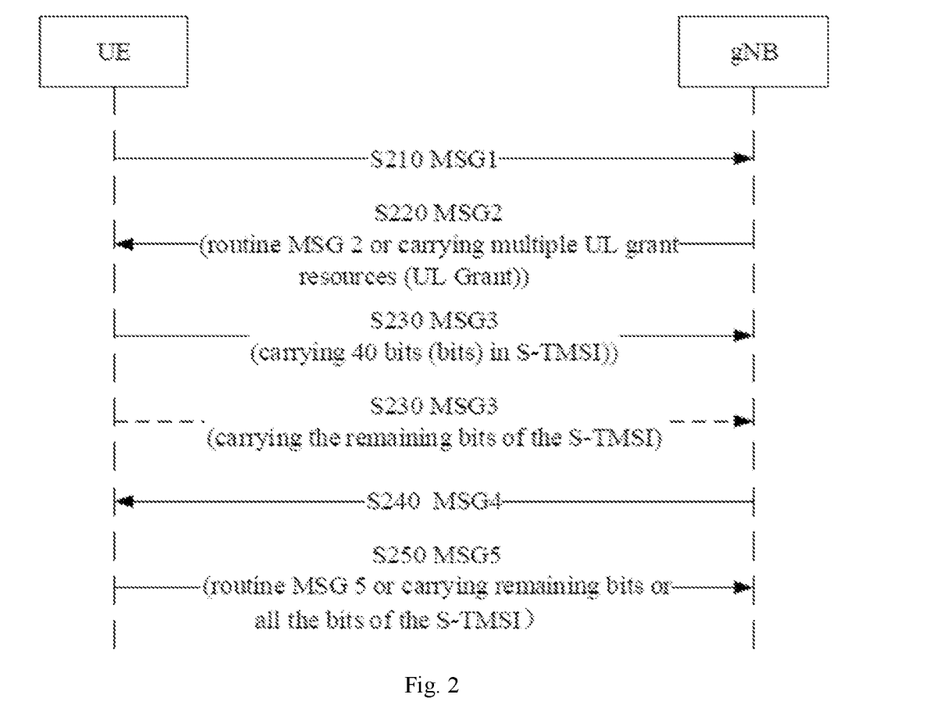
FIG. 2 is a schematic flowchart of a method for reporting an identity according to a specific embodiment of the present disclosure.

FIG. 2 shows a method for reporting an identity according to a specific embodiment of the present disclosure. FIG. 2 is illustrated by taking an example that the network device is a gNB. As shown in FIG. 2, the method includes the following steps.

In step S210, a UE transmits MSG 1 to the gNB.

Optionally, the MSG 1 carries a preamble in a preamble group corresponding to a UE using the number of bits of an S-TMSI greater than 40, or the MSG 1 is a MSG that carries the same content as MSG 1 in LTE (i.e., conventional MSG 1).

In step S220, the gNB transmits MSG 2 to the UE.

Optionally, in a case that the MSG 1 in step S210 carries the preamble in the preamble group corresponding to the UE using the number of bits of the S-TMSI greater than 40, the MSG 2 carries two UL Grant resources; and in a case that the MSG 1 in step S210 is a routine MSG 1, the MSG 2 in step S220 is a routine MSG 2 (carrying the same content as MSG 2 in LTE).

In step S230, the UE transmits MSG 3 to the gNB, and the MSG 3 carries 40 bits in an S-TMSI.

Optionally, in a case that the MSG 2 in step S220 carries two UL Grant resources, the UE may transmit MSG 3 to gNB again in step S230 (shown by the dotted line in FIG. 2), and the second MSG 3 carries the remaining bits of the S-TMSI; and in a case that the MSG 2 in step S220 is a routine MSG 2 (carrying the same content as MSG 2 in LTE), the UE transmits MSG 3 to the gNB only once.

Optionally, the MSG 3 is a radio resource control (Radio Resource Control, RRC) Connection Setup Request message or a RRC Resume Request message, which is used to request to establish an RRC connection.

In step S240, the gNB transmits MSG 4 to the UE.

Optionally, in a case that the UE transmits two MSGs 3 to the gNB in step S230, the gNB obtains a completed S-TMSI according to the content of the two MSGs 3, completes contention resolution, and transmits the MSG 4 to the UE; and in a case that the UE transmits one MSG 3 to the gNB in step S230, the gNB directly transmits the MSG 4 to the UE.

In step S250, the UE transmits MSG 5 to the gNB.

Optionally, in a case that the UE transmits two MSGs 3 to the gNB in step S230, the MSG 5 is a regular MSG 5 (the same content as MSG 5 in LTE); and in a case that the UE transmits one MSG 3 to the gNB in S230, the MSG 5 may carry the remaining bits of the S-TMSI, or the MSG 5 may carry all the bits of the S-TMSI.

Figure 3:
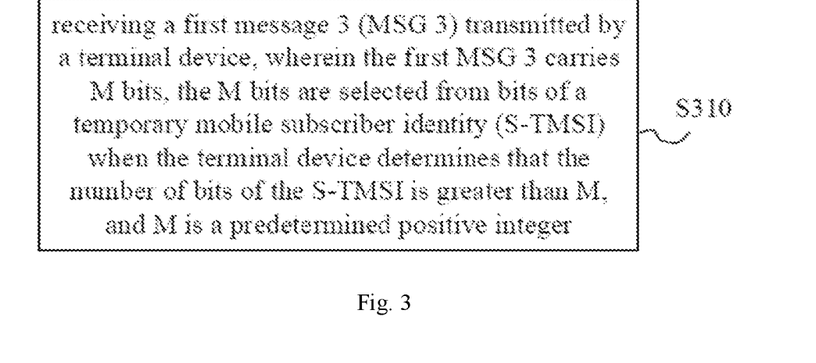
FIG. 3 is a schematic flowchart of a method for reporting an identity according to another embodiment of the present disclosure.

FIG. 3 shows a method for reporting an identity according to another embodiment of the present disclosure. It can be understood that interactions between the network device and the terminal device described from the network device side are the same as those described from the terminal device side in the method shown in FIG. 1, and to avoid repetition, relevant descriptions are appropriately omitted. The method shown in FIG. 3 is executed by a network device. As shown in FIG. 3, the method includes step S310: receiving a first message 3 (MSG 3) transmitted by a terminal device, wherein the first MSG 3 carries M bits, the M bits are selected from bits of a temporary mobile subscriber identity (S-TMSI) when the terminal device determines that the number of bits of the S-TMSI is greater than M, and M is a predetermined positive integer.

According to the method of the embodiments of the present disclosure, M bits carried in MSG 3 that is transmitted by a terminal device and received by a network device is selected from bits of an S-TMSI by the terminal device when determining that the number of bits of the S-TMSI to be reported is greater than a predetermined positive integer M, which can provide a solution for the terminal device to report, to a network device, the S-TMSI whose length exceeds an S-TMSI length specified in an existing protocol, so that a core network identity of any length can be supported in the new radio, thereby improving the effectiveness of communications.

Optionally, as an embodiment, the method shown in FIG. 3 further includes:

receiving a target preamble transmitted by the terminal device, wherein the target preamble is selected by the terminal device from a target preamble group, the target preamble group is one of a plurality of preamble groups, and different preamble groups in the plurality of preamble groups respectively indicate to a network that the terminal device uses different numbers of bits of S-TMSIs or that the terminal device uses MSGs 3 with different sizes; and transmitting a MSG 2 to the terminal device when determining that the number of bits of the S-TMSI is greater than M according to the target preamble, wherein the MSG 2 includes indication information for indicating a first uplink grant resource and a second uplink grant resource, wherein step S310 includes: receiving, on the first uplink grant resource, the first MSG 3 transmitted by the terminal device.

Optionally, as an embodiment, the method shown in FIG. 3 further includes: receiving, on the second uplink grant resource, a second MSG 3 transmitted by the terminal device, wherein the second MSG 3 carries other bits of the S-TMSI than the M bits; and determining the S-TMSI according to the M bits and the other bits.

Optionally, as an embodiment, the method shown in FIG. 3 further includes: receiving a MSG 5 transmitted by the terminal device, wherein the MSG 5 carries other bits of the S-TMSI than the M bits; and determining the S-TMSI according to the M bits and the other bits.

Optionally, as an embodiment, the method shown in FIG. 3 further includes: receiving a MSG 5 transmitted by the terminal device, wherein the MSG 5 carries all the bits of the S-TMSI; and determining the S-TMSI according to the all bits.

Optionally, as an embodiment, the bits of the S-TMSI include a first group of bits, a second group of bits, and a third group of bits, the number of the first group of bits is N, the number of the second group of bits is K, the number of the third group of bits is L, N, K, and L are positive integers, and the sum of N, K, and L is greater than M.

Optionally, as an embodiment, the first group of bits is used to carry an access and mobility management function (AMF) set identity, the second group of bits is used to carry an AMF pointer identity, and the third group of bits is used to carry an identity of the terminal device corresponding to an AMF.

The method for reporting an identity according to embodiments of the present disclosure is described in detail above in conjunction with FIG. 1 to FIG. 3. The terminal device according to embodiments of the present disclosure will be described in detail below with reference to FIG. 4.

Figure 4:
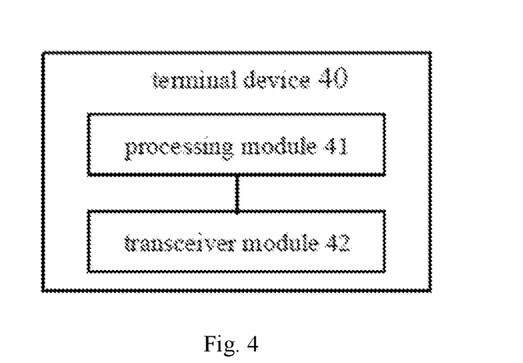
FIG. 4 is a schematic structural diagram of a terminal device according to an embodiment of the present disclosure.

FIG. 4 is a schematic structural diagram of a terminal device according to an embodiment of the present disclosure. As shown in FIG. 4, the terminal device 40 includes:

a processing module 41, configured to, when determining that the number of bits of a temporary mobile subscriber identity (S-TMSI) is greater than M, select M bits from the bits of the S-TMSI, wherein M is a predetermined positive integer; and a transceiver module 42, configured to transmit a first message 3 (MSG 3) to a network device, wherein the first MSG 3 carries the M bits.

According to the embodiments of the present disclosure, when determining that the number of bits of a temporary mobile subscriber identity (S-TMSI) to be reported is greater than a predetermined positive integer M, a terminal device selects M bits from the bits of the S-TMSI, and the selected M bits are carried by MSG 3, so that S-TMSI reporting is successfully achieved. Therefore, a solution is provided for the terminal device to report, to a network device, the S-TMSI whose length exceeds an S-TMSI length specified in an existing protocol, so that a core network identity of any length can be supported in the new radio, thereby improving the effectiveness of communications.

Optionally, as an embodiment, the bits of the S-TMSI include a first group of bits, a second group of bits, and a third group of bits, the number of the first group of bits is N, the number of the second group of bits is K, the number of the third group of bits is L, N, K, and L are positive integers, and the sum of N, K, and L is greater than M.

Optionally, as an embodiment, the processing module 41 is specifically configured to select the M bits from the bits of the S-TMSI according to one of the following manners:

reserving all the bits in the first group of bits and all the bits in the second group of bits, and selecting M-N-K bits from the third group of bits, wherein M-N-K is a positive integer;

reserving all the bits in the third group of bits, and selecting M-L bits from the first group of bits and the second group of bits, wherein the number of a bit selected from each of the first group of bits and the second group of bits is not equal to 0; or selecting S bits from the first group of bits and the second group of bits, and selecting M-S bits from the third group of bits, wherein the number of a bit selected from each of the first group of bits and the second group of bits is not equal to 0, S is less than the sum of L and N, M-S is a positive integer, and M-S is less than L.

Optionally, as an embodiment, the processing module 41 is specifically configured to: select M-N-K most significant bits in the third group of bits; or select M-N-K least significant bits in the third group of bits.

Optionally, as an embodiment, the processing module 41 is specifically configured to select the M-L bits from the first group of bits and the second group of bits according to one of following manners:

selecting Z most significant bits in the first group of bits, and selecting M-L-Z most significant bits in the second group of bits;

selecting Z most significant bits in the first group of bits, and selecting M-L-Z least significant bits in the second group of bits;

selecting Z least significant bits in the first group of bits, and selecting M-L-Z most significant bits in the second group of bits; or selecting Z least significant bits in the first group of bits, and selecting M-L-Z least significant bits in the second group of bits.

Optionally, as an embodiment, the processing module 41 is specifically configured to select the S bits from the first group of bits and the second group of bits, and select the M-S bits from the third group of bits according to one of following manners:

selecting W most significant bits in the first group of bits, selecting S-W most significant bits in the second group of bits, and selecting M-S most significant bits in the third group of bits;

selecting W most significant bits in the first group of bits, selecting S-W most significant bits in the second group of bits, and selecting M-S least significant bits in the third group of bits;

selecting W most significant bits in the first group of bits, selecting S-W least significant bits in the second group of bits, and selecting M-S least significant bits in the third group of bits;

selecting W most significant bits in the first group of bits, selecting S-W least significant bits in the second group of bits, and selecting M-S most significant bits in the third group of bits;

selecting W least significant bits in the first group of bits, selecting S-W most significant bits in the second group of bits, and selecting M-S most significant bits in the third group of bits;

selecting W least significant bits in the first group of bits, selecting S-W most significant bits in the second group of bits, and selecting M-S least significant bits in the third group of bits;

selecting W least significant bits in the first group of bits, selecting S-W least significant bits in the second group of bits, and selecting M-S least significant bits in the third group of bits; or selecting W least significant bits in the first group of bits, selecting S-W least significant bits in the second group of bits, and selecting M-S most significant bits in the third group of bits.

Optionally, as an embodiment, the terminal device is configured with a first uplink grant resource and a second uplink grant resource; and the transceiver module 42 is specifically configured to transmit the first MSG 3 on the first uplink grant resource.

Optionally, as an embodiment, the transceiver module 42 is further configured to transmit a second MSG 3 on the second uplink grant resource, wherein the second MSG 3 carries bits of the S-TMSI except the M bits.

Optionally, as an embodiment, before transmitting the first MSG 3 to the network device, the processing module 41 is further configured to: determine a target preamble group from a plurality of preamble groups, wherein different preamble groups in the plurality of preamble groups respectively indicate to a network that the terminal device uses different numbers of bits of S-TMSIs or that the terminal device uses MSG 3 with different sizes; and select a target preamble from the target preamble group. The transceiver module 42 is further configured to transmit the target preamble to the network device; and receive a MSG 2 transmitted by the network device based on the target preamble, wherein the MSG 2 includes indication information for indicating the first uplink grant resource and the second uplink grant resource.

Optionally, as an embodiment, the transceiver module 42 is further configured to: transmit a MSG 5 to the network device, wherein the MSG 5 carries bits of the S-TMSI except the M bits; or transmit a MSG 5 to the network device, wherein the MSG 5 carries all the bits of the S-TMSI.

Optionally, as an embodiment, the first group of bits is used to carry an access and mobility management function (AMF) set identity, the second group of bits is used to carry an AMF pointer identity, and the third group of bits is used to carry an identity of the terminal device corresponding to an AMF.

The terminal device according to the embodiments of the present disclosure can correspondingly refer to processes of the method shown in FIG. 1 according to the above embodiments of the present disclosure, and multiple units/modules in the terminal device and the other operations and/or functions described above are used to implement the processes of the method shown in FIG. 1, respectively, which will not be repeated herein, for the sake of brevity.

Figure 5:
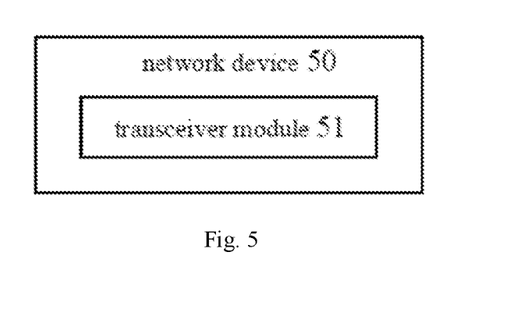
FIG. 5 is a schematic structural diagram of a network device according to an embodiment of the present disclosure.

FIG. 5 is a schematic structural diagram of a network device according to an embodiment of the present disclosure. As shown in FIG. 5, the network device 50 includes a transceiver module 51 configured to: receive a first message 3 (MSG 3) transmitted by a terminal device, wherein the first MSG 3 carries M bits, the M bits are selected from bits of a temporary mobile subscriber identity (S-TMSI) when the terminal device determines that the number of bits of the S-TMSI is greater than M, and M is a predetermined positive integer.

According to the embodiments of the present disclosure, M bits carried in MSG 3 that is transmitted by a terminal device and received by a network device is selected from bits of an S-TMSI by the terminal device when determining that the number of bits of the S-TMSI to be reported is greater than a predetermined positive integer M, which can provide a solution for the terminal device to report, to a network device, the S-TMSI whose length exceeds an S-TMSI length specified in an existing protocol. Therefore, a core network identity of any length can be supported in the new radio, and the effectiveness of communications can be improved.

Optionally, as an embodiment, the transceiver module 51 is further configured to:

receive a target preamble transmitted by the terminal device, wherein the target preamble is selected by the terminal device from a target preamble group, the target preamble group is one of a plurality of preamble groups, and different preamble groups in the plurality of preamble groups respectively indicate to a network that the terminal device uses different numbers of bits of S-TMSIs or that the terminal device uses MSGs 3 with different sizes; and transmit a MSG 2 to the terminal device when determining that the number of bits of the S-TMSI is greater than M according to the target preamble, wherein the MSG 2 includes indication information for indicating a first uplink grant resource and a second uplink grant resource, wherein when receiving the first message (MSG 3) transmitted by the terminal device, the transceiver module 51 is specifically configured to receive, on the first uplink grant resource, the first MSG 3 transmitted by the terminal device.

Optionally, as an embodiment, the transceiver module 51 is further configured to: receive, on the second uplink grant resource, a second MSG 3 transmitted by the terminal device, wherein the second MSG 3 carries bits of the S-TMSI except the M bits; and determine the S-TMSI according to the M bits and the bits of the S-TMSI except the M bits.

Optionally, as an embodiment, the transceiver module 51 is further configured to: receive a MSG 5 transmitted by the terminal device, wherein the MSG 5 carries bits of the S-TMSI except the M bits; and determine the S-TMSI according to the M bits and the bits of the S-TMSI except the M bits.

Optionally, as an embodiment, the transceiver module 51 is further configured to: receive a MSG 5 transmitted by the terminal device, wherein the MSG 5 carries all the bits of the S-TMSI; and determine the S-TMSI according to the all bits.

Optionally, as an embodiment, the bits of the S-TMSI include a first group of bits, a second group of bits, and a third group of bits, the number of the first group of bits is N, the number of the second group of bits is K, the number of the third group of bits is L, N, K, and L are positive integers, and the sum of N, K, and L is greater than M.

Optionally, as an embodiment, the first group of bits is used to carry an access and mobility management function (AMF) set identity, the second group of bits is used to carry an AMF pointer identity, and the third group of bits is used to carry an identity of the terminal device corresponding to an AMF.

The network device according to the embodiments of the present disclosure may correspondingly refer to processes of the method shown in FIG. 3 corresponding to the above embodiments of the present disclosure, and multiple units/modules in the terminal device and the other operations and/or functions described above are used to implement the processes of the method shown in FIG. 3, respectively, which will not be repeated herein, for the sake of brevity.

Figure 6:
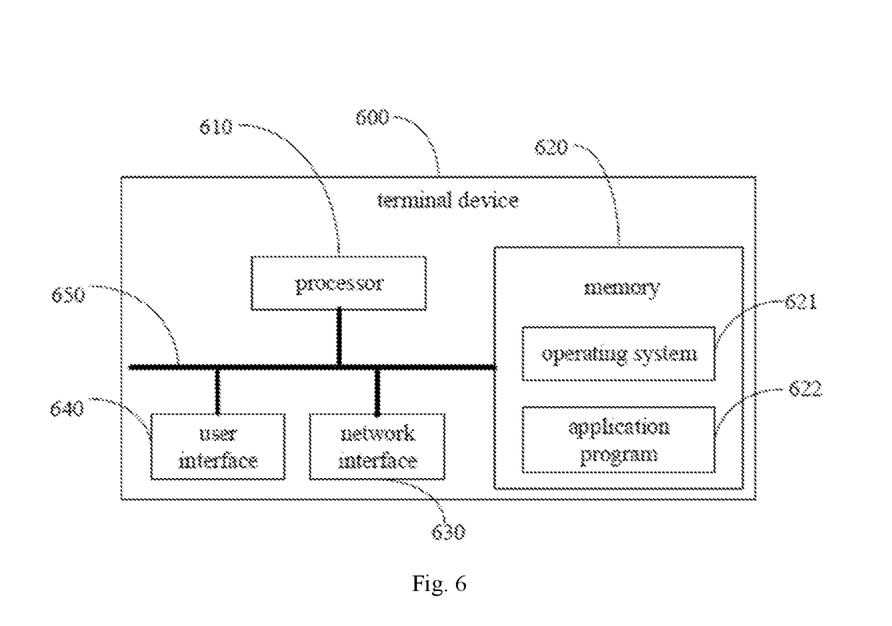
FIG. 6 is a schematic structural diagram of a terminal device according to another embodiment of the present disclosure.

FIG. 6 shows a schematic structural diagram of a terminal device according to another embodiment of the present disclosure. As shown in FIG. 6, the terminal device 600 includes: at least one processor 610, a memory 620, at least one network interface 630, and a user interface 640. Various components in the terminal device 600 are coupled together through a bus system 650. It can be understood that the bus system 650 is used to implement connection and communication between these components. In addition to the data bus, the bus system 650 includes a power bus, a control bus, and a status signal bus. However, for clarity of description, various buses are marked as the bus system 650 in FIG. 6.

The user interface 640 may include a display, a keyboard, or a pointing device (for example, a mouse, a trackball (trackball), a touch panel, or a touch screen, etc.).

It can be understood that the memory 620 in embodiments of the present disclosure may be a volatile memory or a non-volatile memory, or may include both the volatile memory and the non-volatile memory. The non-volatile memory may be read-only memory (Read-Only Memory, ROM), programmable read-only memory (Programmable ROM, PROM), erasable programmable read-only memory (Erasable PROM, EPROM), or electrically erasable programmable read-only memory (Electrically EPROM, EEPROM) or flash memory. The volatile memory may be a random access memory (Random Access Memory, RAM), which is used as an external cache. By way of exemplary but not restrictive description, many forms of RAM are available, such as static random access memory (Static RAM, SRAM), dynamic random access memory (Dynamic RAM, DRAM), synchronous dynamic random access memory (Synchronous DRAM, SDRAM), double data rate synchronous dynamic random access memory (Double Data Rate SDRAM, DDRSDRAM), enhanced synchronous dynamic random access memory (Enhanced SDRAM, ESDRAM), synchlink dynamic random access memory (Synchlink DRAM, SLDRAM) and direct Rambus random access memory (Direct Rambus RAM, DRRAM). The memory 620 in the system and the method described in embodiments of the present disclosure is intended to include, but not limited to, these and any other suitable types of memory.

In some embodiments, the memory 620 stores the following elements, executable modules or data structures, or subsets thereof, or extended sets thereof: an operating system 621 and an application program 622.

The operating system 621 includes various system programs, such as a framework layer, a core library layer, and a driver layer, which are used to implement various basic services and process hardware-based tasks. The application program 622 includes various application programs, such as a media player (Media Player), a browser (Browser), which are used to implement various application services. A program for implementing the method according to embodiments of the present disclosure may be included in the application program 622.

In embodiments of the present disclosure, the terminal device 600 further includes: a program stored in the memory 620 and executable on the processor 610. The computer program is executed by the processor 610 to implement various processes of the method described in FIG. 6, and the same technical effects can be achieved, which are not repeated herein, so as to avoid repetition.

The method disclosed in the above embodiments of the present disclosure may be applied to the processor 901 or implemented by the processor 901. The processor 901 may be an integrated circuit chip with signal processing capability. In an implementation process, various steps of the foregoing method can be completed by a hardware integrated logic circuit in the processor 901 or by instructions in the form of software. The aforementioned processor 901 may be a general purpose processor, a digital signal processor (Digital Signal Processor, DSP), an application specific integrated circuit (Application Specific Integrated Circuit, ASIC), a field programmable gate array (Field Programmable Gate Array, FPGA) or other programmable logic devices, a discrete gate or transistor logic device, or a discrete hardware component, which can implement or execute methods, steps, and logical block diagrams disclosed in embodiments of the present disclosure. The general-purpose processor may be a microprocessor or any conventional processor or the like. The steps of the method disclosed in some embodiments of the present disclosure may be directly embodied as being executed and completed by a hardware decoding processor, or executed and completed by a combination of hardware and software modules in the decoding processor. The software modules may be located in a computer-readable storage medium that is mature in the field, such as random access memory, flash memory, read-only memory, programmable read-only memory, electrically erasable programmable memory, or register. The computer-readable storage medium is located in the memory 902, and the processor 901 reads information from the memory 902, and completes the steps of the foregoing method in combination with its hardware. Specifically, a computer program is stored on the computer-readable storage medium, and when the computer program is executed by the processor 901, the processor 901 implements various steps of the foregoing embodiments about the method for canceling the uplink transmission.

It can be understood that the embodiments described in embodiments of the present disclosure may be implemented by hardware, software, firmware, middleware, microcode, or a combination thereof. For hardware implementation, the processing unit can be implemented in one or more of: application specific integrated circuit (Application Specific Integrated Circuit, ASIC), digital signal processor (Digital Signal Processor, DSP), DSP device (DSP Device, DSPD), programmable logic device (Programmable Logic Device, PLD), field programmable gate array (Field Programmable Gate Array, FPGA), general-purpose processor, controller, microcontroller, microprocessor, or other electronic units for performing the functions described in the present disclosure or a combination thereof.

For software implementation, the technology described in embodiments of the present disclosure can be implemented by executing functional modules (for example, procedures, functions, etc.) described in embodiments of the present disclosure. The software codes can be stored in the memory and executed by the processor. The memory can be implemented in the processor or external to the processor.

Figure 7:
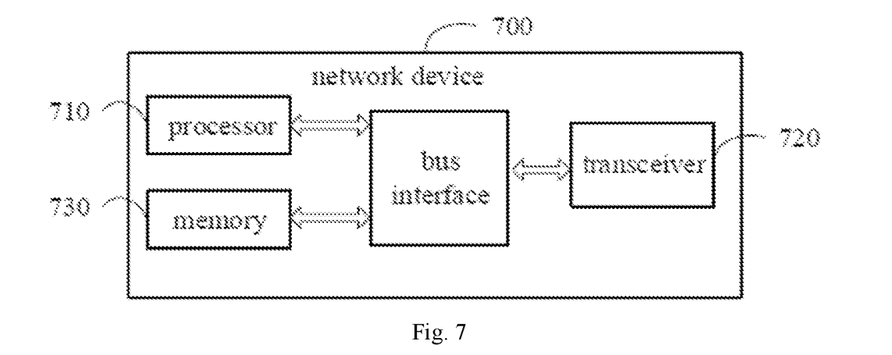
FIG. 7 is a schematic structural diagram of a network device according to another embodiment of the present disclosure.

FIG. 7 shows a schematic structural diagram of a network device according to another embodiment of the present disclosure. As shown in FIG. 7, the network device 700 includes a processor 710, a transceiver 720, a memory 730, and a bus interface.

In embodiments of the present disclosure, the network device 700 further includes: a program that is stored on the memory 730 and executable on the processor 710. The program is executed by the processor 710 to implement various processes of the method shown in FIG. 7, and the same technical effects can be achieved, which are not repeated herein, so as to avoid repetition.

In FIG. 7, the bus architecture may include any number of interconnected buses and bridges. Specifically, various circuits including one or more processors represented by the processor 710 and a memory represented by the memory 730 are linked together. The bus architecture can also link various other circuits such as peripherals, voltage regulators, power management circuits, etc., which are all known in the art, and therefore, no further descriptions are provided herein. The bus interface provides an interface. The transceiver 720 may be a plurality of elements, i.e., including a transmitter and a receiver, and may provide a unit for communicating with various other devices on a transmission medium.

The processor 710 is responsible for managing the bus architecture and general processing, and the memory 730 may store data used by the processor 710 when performing operations.

Embodiments of the present disclosure further provide a computer-readable storage medium, where a program is stored on the computer-readable storage medium. The computer program is executed by a processor to implement respective processes of the above method embodiments, and the same technical effects can be achieved, which are not repeated herein, so as to avoid repetition. The computer-readable storage medium may be, for example, read-only memory (Read-Only Memory, ROM), random access memory (Random Access Memory, RAM), magnetic disk, or optical disk, etc.

It should be noted that in this article, the terms "include", "include" or any other variants thereof are intended to cover non-exclusive inclusion, so that a process, method, article or device including a series of elements not only includes those elements, It also includes other elements not explicitly listed, or elements inherent to the process, method, article, or device. If there are no more restrictions, the element defined by the sentence "including a . . . " does not exclude the existence of other identical elements in the process, method, article or device that includes the element.

Based on the description of the above embodiments, those skilled in the art can clearly understand that the method according to the above embodiments can be implemented by means of software plus the necessary general hardware platform, and of course, can also be implemented by hardware, but in many cases the former is better. Based on such understanding, the technical solutions of the present disclosure essentially or the part that contributes to the prior art can be embodied in the form of a software product. The computer software product is stored in a storage medium (such as ROM/RAM, magnetic disk, or optical disc), and includes several instructions to make a terminal (which may be a mobile phone, a computer, a server, an air conditioner, or a network device, etc.) execute the methods described in the various embodiments of the present disclosure.

The embodiments of the present disclosure are described above with reference to the accompanying drawings, but the present disclosure is not limited to the above-mentioned specific embodiments. The above-mentioned specific embodiments are only illustrative and not restrictive. Those of ordinary skill in the art can make many forms under teaching of the present disclosure and without departing from the principle of the present disclosure and the protection scope of the claims, all of which shall fall within the protection of the present disclosure.

What is claimed is:

1. A method for reporting an identity, applied to a terminal device, comprising:
when determining that the number of bits of a temporary mobile subscriber identity (5G-S-TMSI) is greater than M, selecting M bits from the bits of the 5G-S-TMSI, wherein M is a predetermined positive integer; and
transmitting a first message 3 (MSG 3) to a network device, wherein the first MSG 3 carries the M bits,
wherein the bits of the 5G-S-TMSI comprise a first group of bits, a second group of bits, and a third group of bits, the number of the first group of bits is N, the number of the second group of bits is K, the number of the third group of bits is L, N, K, and L are positive integers, and the sum of N, K, and L is greater than M.

2. The method according to claim 1, wherein the selecting the M bits from the bits of the 5G-S-TMSI comprises selecting the M bits from the bits of the 5G-S-TMSI according to one of following manners:
reserving all the bits in the first group of bits and all the bits in the second group of bits, and selecting M-N-K bits from the third group of bits, wherein M-N-K is a positive integer;
reserving all the bits in the third group of bits, and selecting M-L bits from the first group of bits and the second group of bits, wherein the number of a bit selected from each of the first group of bits and the second group of bits is not equal to 0; or
selecting S bits from the first group of bits and the second group of bits, and selecting M-S bits from the third group of bits, wherein the number of a bit selected from each of the first group of bits and the second group of bits is not equal to 0, S is less than the sum of L and N, M-S is a positive integer, and M-S is less than L.

3. The method according to claim 2, wherein the selecting the M-N-K bits from the third group of bits comprises:
selecting M-N-K most significant bits in the third group of bits; or
selecting M-N-K least significant bits in the third group of bits.

4. The method according to claim 2, wherein the selecting the M-L bits from the first group of bits and the second group of bits comprises selecting the M-L bits from the first group of bits and the second group of bits according to one of following manners:
selecting Z most significant bits in the first group of bits, and selecting M-L-Z most significant bits in the second group of bits;
selecting Z most significant bits in the first group of bits, and selecting M-L-Z least significant bits in the second group of bits;
selecting Z least significant bits in the first group of bits, and selecting M-L-Z most significant bits in the second group of bits; or
selecting Z least significant bits in the first group of bits, and selecting M-L-Z least significant bits in the second group of bits.

5. The method according to claim 2, wherein the selecting the S bits from the first group of bits and the second group of bits, and selecting the M-S bits from the third group of bits comprises: selecting the S bits from the first group of bits and the second group of bits, and selecting the M-S bits from the third group of bits according to one of following manners:

selecting W most significant bits in the first group of bits, selecting S-W most significant bits in the second group of bits, and selecting M-S most significant bits in the third group of bits;

selecting W most significant bits in the first group of bits, selecting S-W most significant bits in the second group of bits, and selecting M-S least significant bits in the third group of bits;

selecting W most significant bits in the first group of bits, selecting S-W least significant bits in the second group of bits, and selecting M-S least significant bits in the third group of bits;

selecting W most significant bits in the first group of bits, selecting S-W least significant bits in the second group of bits, and selecting M-S most significant bits in the third group of bits;

selecting W least significant bits in the first group of bits, selecting S-W most significant bits in the second group of bits, and selecting M-S most significant bits in the third group of bits;

selecting W least significant bits in the first group of bits, selecting S-W most significant bits in the second group of bits, and selecting M-S least significant bits in the third group of bits;

selecting W least significant bits in the first group of bits, selecting S-W least significant bits in the second group of bits, and selecting M-S least significant bits in the third group of bits; or selecting W least significant bits in the first group of bits, selecting S-W least significant bits in the second group of bits, and selecting M-S most significant bits in the third group of bits.

6. The method according to claim 2, wherein the terminal device is configured with a first uplink grant resource and a second uplink grant resource; and
wherein the transmitting the first message (MSG 3) to the network device comprises transmitting the first MSG 3 on the first uplink grant resource.

7. The method according to claim 6, further comprising: transmitting a second MSG 3 on the second uplink grant resource, wherein the second MSG 3 carries bits of the 5G-S-TMSI except the M bits.

8. The method according to claim 6, wherein before transmitting the first MSG 3 to the network device, the method further comprises:
determining a target preamble group from a plurality of preamble groups, wherein different preamble groups in the plurality of preamble groups respectively indicate to a network that the terminal device uses different numbers of bits of 5G-S-TMSIs or that the terminal device uses MSGs 3 with different sizes;
selecting a target preamble from the target preamble group;
transmitting the target preamble to the network device; and
receiving a message 2 (MSG 2) transmitted by the network device based on the target preamble, wherein the MSG 2 comprises indication information for indicating the first uplink grant resource and the second uplink grant resource.

9. The method according to claim 1, further comprising: transmitting a message 5 (MSG 5) to the network device, wherein the MSG 5 carries bits of the 5G-S-TMSI except the M bits; or
transmitting a MSG 5 to the network device, wherein the MSG 5 carries all the bits of the 5G-S-TMSI.

10. The method according to claim 1, wherein the first group of bits is used to carry an access and mobility management function (AMF) set identity, the second group of bits is used to carry an AMF pointer identity, and the third group of bits is used to carry an identity of the terminal device corresponding to an AMF.

11. A network device, comprising a memory, a processor, and a program that is stored on the memory and executable on the processor, wherein when executing the program, the processor is configured to:
receive a first message 3 (MSG 3) transmitted by a terminal device, wherein the first MSG 3 carries M bits, the M bits are selected from bits of a temporary mobile subscriber identity (5G-S-TMSI) when the terminal device determines that the number of bits of the 5G-S-TMSI is greater than M, and M is a predetermined positive integer,
wherein the processor is further configured to:
receive a target preamble transmitted by the terminal device, wherein the target preamble is selected by the terminal device from a target preamble group, the target preamble group is one of a plurality of preamble groups, and different preamble groups in the plurality of preamble groups respectively indicate to a network that the terminal device uses different numbers of bits of 5G-S-TMSI or that the terminal device uses MSGs 3 with different sizes; and
transmit a message 2 (MSG 2) to the terminal device when determining that the number of bits of the 5G-S-TMSI is greater than M according to the target preamble, wherein the MSG 2 comprises indication information for indicating a first uplink grant resource and a second uplink grant resource,
wherein the receiving the first message (MSG 3) transmitted by the terminal device comprises: receiving, on the first uplink grant resource, the first MSG 3 transmitted by the terminal device.

12. The network device according to claim 11, wherein the processor is further configured to:
receive, on the second uplink grant resource, a second MSG 3 transmitted by the terminal device, wherein the second MSG 3 carries bits of the 5G-S-TMSI except the M bits; and
determine the 5G-S-TMSI according to the M bits and the bits of the 5G S-TMSI except the M bits.

13. The network device according to claim 11, wherein the processor is further configured to:
receive a message 5 (MSG 5) transmitted by the terminal device, wherein the MSG 5 carries bits of the 5G-S-TMSI except the M bits; and
determine the 5G-S-TMSI according to the M bits and the bits of the 5G S-TMSI except the M bits, or
wherein the processor is further configured to:
receive a MSG 5 transmitted by the terminal device, wherein the MSG 5 carries all the bits of the 5G-S-TMSI; and
determine the 5G-S-TMSI according to the all bits.

14. A terminal device, comprising a memory, a processor, and a program that is stored on the memory and executable on the processor, wherein when executing the program, the processor is configured to:
when determining that the number of bits of a temporary mobile subscriber identity (5G-S-TMSI) is greater than M, select M bits from the bits of the 5G-S-TMSI, wherein M is a predetermined positive integer; and
transmit a first message 3 (MSG 3) to a network device, wherein the first MSG 3 carries the M bits, wherein the bits of the 5G-S-TMSI comprise a first group of bits, a second group of bits, and a third group of bits, the number of the first group of bits is N, the number of the second group of bits is K, the number of the third group of bits is L, N, K, and L are positive integers, and the sum of N, K, and L is greater than M.

15. The terminal device according to claim 14, wherein the processor is specifically configured to select the M bits from the bits of the 5G-S-TMSI according to one of following manners:

reserving all the bits in the first group of bits and all the bits in the second group of bits, and selecting M-N-K bits from the third group of bits, wherein M-N-K is a positive integer;

reserving all the bits in the third group of bits, and selecting M-L bits from the first group of bits and the second group of bits, wherein the number of a bit selected from each of the first group of bits and the second group of bits is not equal to 0; or selecting S bits from the first group of bits and the second group of bits, and selecting M-S bits from the third group of bits, wherein the number of a bit selected from each of the first group of bits and the second group of bits is not equal to 0, S is less than the sum of L and N, M-S is a positive integer, and M-S is less than L.

16. The terminal device according to claim 14, wherein the terminal device is configured with a first uplink grant resource and a second uplink grant resource; and wherein the processor is specifically configured to transmit the first MSG 3 on the first uplink grant resource.

17. The terminal device according to claim 16, wherein the processor is further configured to:

transmit a second MSG 3 on the second uplink grant resource, wherein the second MSG 3 carries bits of the 5G-S-TMSI except the M bits.

* * * * *